No. 867,116. PATENTED SEPT. 24, 1907.
C. G. ETTE.
NUT LOCK WASHER.
APPLICATION FILED JUNE 3, 1907.
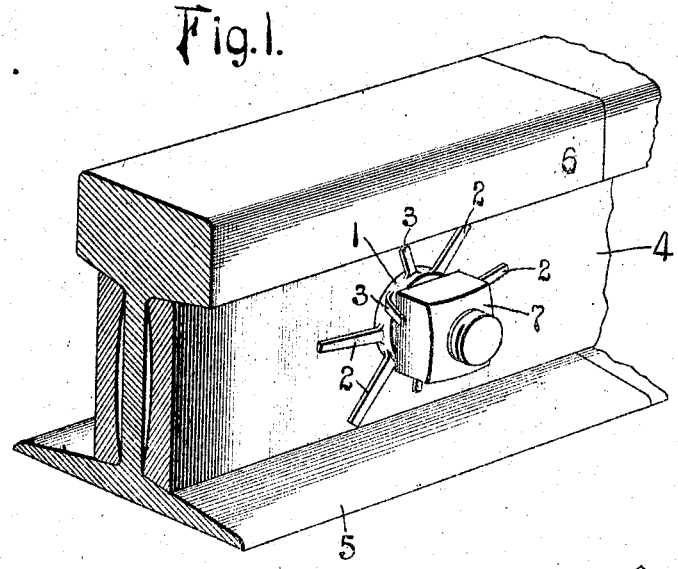
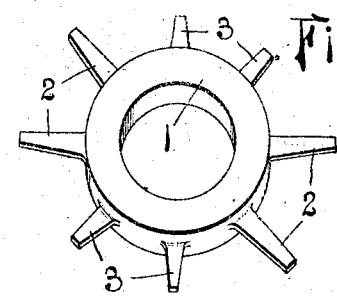
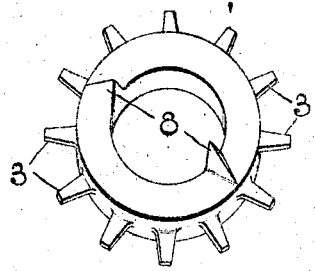
Witnesses
O. J. McCauley
Nells L. Church
Inventor:
Charles G. Ette
by Bakewell Cornwall
Att'ys.

UNITED STATES PATENT OFFICE.

CHARLES G. ETTE, OF ST. LOUIS, MISSOURI.

NUT-LOCK WASHER.

No. 867,116.

Specification of Letters Patent.

Patented Sept. 24, 1907.

Application filed June 3, 1907. Serial No. 376,942.

*To all whom it may concern:*

Be it known that I, CHARLES G. ETTE, a citizen of the United States, residing at St. Louis, Missouri, have invented a certain new and useful Improvement in Nut-Lock Washers, of which the following is a full, clear, and exact description, such as will enable others skilled in the art to which it appertains to make and use the same, reference being had to the accompanying drawings, forming part of this specification, in which—

Figure 1 is a perspective view illustrating my improved nut-lock washer used in connection with a rail joint; Fig. 2 is an enlarged view of the washer; and Fig. 3 shows a slightly modified form of my invention.

This invention relates to nut locks, and particularly to that type which consists of a washer provided with an integral tongue that is adapted to be bent into engagement with the nut to prevent it from turning.

The main object of my invention is to provide a nut-lock washer provided with radially projecting tongues which are so formed that when the washer is in operative position a cold chisel or other suitable tool can be easily inserted between one of the tongues and the structure through which the bolt extends to bend the tongue into engagement with the nut.

Another object of my invention is to provide a nut-lock washer which is so constructed that it can be placed in operative position with either of its side faces bearing against the structure through which the bolt extends. And still another object of my invention is to provide a nut-lock washer that can be manufactured at a small cost.

Other desirable features of my invention will be hereinafter pointed out.

The nut-lock washers of this type which have heretofore been used are provided with a tongue that lies tightly against the structure through which the bolt passes so that it is necessary to partially turn over or bevel the end of the tongue during the process of manufacturing the washer for the purpose of permitting a tool to be inserted between the tongue and the structure to bend the tongue into engagement with the nut. Furthermore, said washers are so constructed that a certain degree of care has to be exercised when placing the washers in operative position due to the fact that one particular side of the washer has to be placed against the structure. Said washers are also more or less complicated and require machine work in their manufacture which adds greatly to the cost of production.

The nut-lock washer herein shown which represents the preferred form of my invention, overcomes the objectionable features above referred to, and briefly described, consists of a round malleable iron washer provided with a plurality of integral radially projecting tongues of less thickness than the washer and located midway the two side faces of the washer.

Referring to Figs. 1 and 2 of the drawings which represent the preferred form of my invention, 1 designates a comparatively thick round washer formed of malleable iron and provided with a plurality of integral radially projecting tongues 2 and 3 of less thickness than the washer so that when the washer is in operative position there will be a space between the tongues and the outside face of the structure through which the bolt extends, herein shown as the fish plate 4 of a rail joint. The tongues 2 are longer than the tongues 3 so that when the washer is used in connection with a rail joint one of the tongues 2 will bear against the base 5 of the rail and the diametrically opposite tongue 2 will engage the underneath side of the head 6 of the rail and thus prevent the washer from turning. The space between the fish plate and the tongues is of sufficient width to enable a cold chisel or other tool to be inserted easily underneath one of the tongues 3 and bend it outwardly into engagement with the nut 7 to lock same, as shown in Fig. 1. As the tongues 2 and 3 are located at approximately the longitudinal center of the washer, that is to say, an equal distance from each of the side faces of the washer, the washer can be placed in position with either of its side faces bearing against the fish plate, one pair of tongues 2 preventing the washer from turning when one of its side faces bears against the fish plate and the other pair of tongues 2 preventing the washer from turning when its opposite side face bears against the fish plate. The washer is of greater diameter than the nut so that the tongue 3 will only have to be bent or turned about 90° to lock the nut.

Instead of providing the washer with long tongues 2 to prevent it from turning I can form teeth 8 on one of the side faces of the washer, as shown in Fig. 3, so that when used on a bolt that passes through a wooden structure said teeth will be embedded in the wood. This form of washer can also be used on a rail joint in which the fish plate is provided with oval or elongated bolt-holes, the tongues 8 being located adjacent the inner edge of the washer so that they will project into the oval bolt-hole in the fish plate when the washer is in operative position and thus prevent the washer from turning.

As the washer is made of malleable iron it can be cast and accordingly no machine work is required in the process of making it, so that the washer can be produced at a small cost.

Having thus described my invention, what I claim as new and desire to secure by Letters Patent is:

A nut-lock consisting of a comparatively thick round washer provided with a plurality of radially projecting tongues of less thickness than the washer and located the same distance from each of the side faces of the washer, one of said tongues being adapted to be bent into engagement with a nut to lock it on its bolt, and tongues of greater length than the locking tongues to prevent the washer from turning; substantially as described.

In testimony whereof I hereunto affix my signature in the presence of two witnesses, this 28th day of May 1907.

CHARLES G. ETTE.

Witnesses:
WALTER C. RAITHEL,
EDWARD SCHWIDDE.